(12) United States Patent
Westcott

(10) Patent No.: US 12,178,351 B2
(45) Date of Patent: Dec. 31, 2024

(54) BEVERAGE INFUSION PRESS

(71) Applicant: Richard Westcott, Seattle, WA (US)

(72) Inventor: Richard Westcott, Seattle, WA (US)

(*) Notice: Subject to any disclaimer, the term of this patent is extended or adjusted under 35 U.S.C. 154(b) by 737 days.

(21) Appl. No.: 17/157,973

(22) Filed: Jan. 25, 2021

(65) Prior Publication Data

US 2021/0228015 A1    Jul. 29, 2021

Related U.S. Application Data

(60) Provisional application No. 62/965,991, filed on Jan. 26, 2020.

(51) Int. Cl.
*A47J 31/20* (2006.01)
*A47J 31/06* (2006.01)

(52) U.S. Cl.
CPC .......... *A47J 31/20* (2013.01); *A47J 31/0615* (2013.01)

(58) Field of Classification Search
CPC .............................. A47J 31/20; A47J 31/0615
See application file for complete search history.

(56) References Cited

U.S. PATENT DOCUMENTS

| | | | |
|---|---|---|---|
| 918,674 A | 4/1909 | Hathaway | |
| 1,346,485 A * | 7/1920 | De Arrigunaga | A47J 31/20 99/287 |
| 3,307,474 A | 3/1967 | Kasher | |
| 3,935,318 A * | 1/1976 | Mihailide | B65D 85/812 426/282 |
| 5,478,586 A * | 12/1995 | Connor | A47J 31/20 426/433 |
| D372,627 S | 8/1996 | Ireland | |
| 5,616,570 A * | 4/1997 | Lange, III | A61K 31/737 514/59 |
| 5,632,194 A | 5/1997 | Lin | |
| 5,635,233 A | 6/1997 | Levinson | |
| 5,880,441 A * | 3/1999 | Hartman | A47J 31/547 219/689 |
| 5,887,510 A * | 3/1999 | Porter | A47J 31/20 99/287 |
| 5,932,098 A * | 8/1999 | Ross | A47J 31/605 210/473 |

(Continued)

OTHER PUBLICATIONS

Zyliss Hot Mug Cafetiere, [online] Mar. 5, 2014, retrieved Sep. 22, 2023. Retrieved from the Internet: URL:<https://www.amazon.com/Zyliss-Cafetiere-Hot-Mug-Red/dp/B00DB4JY72/ref=psdc_13162311_t1_B00F9ZTL6U?th=1>. (Year: 2014).*

(Continued)

*Primary Examiner* — Drew E Becker
*Assistant Examiner* — Chaim A Smith
(74) *Attorney, Agent, or Firm* — Shackelford, McKinley & Norton, LLP

(57) ABSTRACT

A beverage infusion press includes a circular bottom structure having an outer bottom radius relative to a central axis and a filter portion operable to permit liquid to pass through the filter portion, a semi-circular top structure extending from a first end to a second end and having an inner top radius and an outer top radius relative to the central axis, and a vertical structure spacing the bottom structure from the top structure, the vertical structure comprising an interior surface, an exterior surface, and an exterior radius from the central axis to the exterior surface.

18 Claims, 4 Drawing Sheets

(56) References Cited

U.S. PATENT DOCUMENTS

| | | | |
|---|---|---|---|
| 5,942,143 A * | 8/1999 | Hartman | A47J 31/547 |
| | | | 219/689 |
| D415,648 S | 10/1999 | Joergensen | |
| 5,979,299 A | 11/1999 | Hornsby et al. | |
| 6,038,963 A * | 3/2000 | Patterson | A47J 31/20 |
| | | | 99/287 |
| 6,422,131 B1 | 7/2002 | Funck | |
| 7,213,507 B2 | 5/2007 | Glucksman et al. | |
| D565,887 S | 4/2008 | Bodum | |
| D789,132 S | 6/2017 | Roberts et al. | |
| D795,630 S | 8/2017 | McLean et al. | |
| D796,244 S | 9/2017 | McLean et al. | |
| D833,196 S | 11/2018 | Mutch et al. | |
| D861,424 S | 10/2019 | Philips | |
| D899,186 S | 10/2020 | McLean et al. | |
| 2005/0109689 A1* | 5/2005 | Trachtenbroit | A47J 31/20 |
| | | | 210/238 |
| 2005/0139091 A1* | 6/2005 | Haverstock | A47J 31/20 |
| | | | 99/495 |
| 2006/0021524 A1* | 2/2006 | Liu | A47J 31/20 |
| | | | 100/116 |
| 2007/0137494 A1* | 6/2007 | Wilhite | A47J 31/20 |
| | | | 99/279 |
| 2008/0305226 A1* | 12/2008 | Catena | A47J 31/20 |
| | | | 426/431 |
| 2009/0277335 A1* | 11/2009 | Baccetti | A47J 31/20 |
| | | | 426/433 |
| 2010/0224078 A1* | 9/2010 | Khalifa | A47J 31/20 |
| | | | 99/323 |

OTHER PUBLICATIONS

Hot Mug, DKB Household, YouTube, [online] 2013—no month given, retrieved Sep. 22, 2023. Retrieved from the Internet: URL: <https://www.youtube.com/watch?v=ttHPQp-4P1E>. (Year: 2013).*

Amazon 2, ZylissHotMugCafetiere,[online]Mar. 5, 2014,retrieved Sep. 22, 2023.RetrievedfromtheInternet:URL: Zyliss-Cafetiere-Hot-Mug-Red/dp/B00DB4JY72/ref=psde_13162311_t1_B00F9ZTL6U?th=1>.(Year:2014).*

* cited by examiner

BEVERAGE INFUSION PRESS

BACKGROUND

This section provides background information to facilitate a better understanding of the various aspects of the disclosure. It should be understood that the statements in this section of this document are to be read in this light, and not as admissions of prior art.

Infused beverages, such as coffee and tea, are popular throughout the world. Many people want to improve the flavor and quality of infused beverages by creating the beverage themselves. Additionally, may want to enjoy freshly infused beverages whether at home or during activities such as traveling, touring, backpacking, and camping.

SUMMARY

This summary is provided to introduce a selection of concepts that are further described below in the detailed description. This summary is not intended to identify key or essential features of the claimed subject matter, nor is it intended to be used as an aid in limiting the scope of claimed subject matter.

An exemplary beverage infusion press includes a circular bottom structure having an outer bottom radius relative to a central axis and a filter portion operable to permit liquid to pass through the filter portion, a semi-circular top structure extending from a first end to a second end and having an inner top radius and an outer top radius relative to the central axis, and a vertical structure spacing the bottom structure from the top structure, the vertical structure comprising an interior surface, an exterior surface, and an exterior radius from the central axis to the exterior surface.

An exemplary method includes placing a liquid and a particulate for creating an infused beverage in a drinking vessel, positioning a circular bottom structure of a press in the drinking vessel, the press comprising the circular bottom structure having an outer bottom radius relative to a central axis and a filter portion, a semi-circular top structure extending from a first end to a second end and having an inner top radius and an outer top radius relative to the central axis, and a vertical structure spacing the bottom structure from the top structure, the vertical structure comprising an interior surface, an exterior surface, and an exterior radius from the central axis to the exterior surface, and pushing the press into the drinking vessel trapping the particulate between the circular bottom structure and the drinking vessel as the liquid passes through the filter portion.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
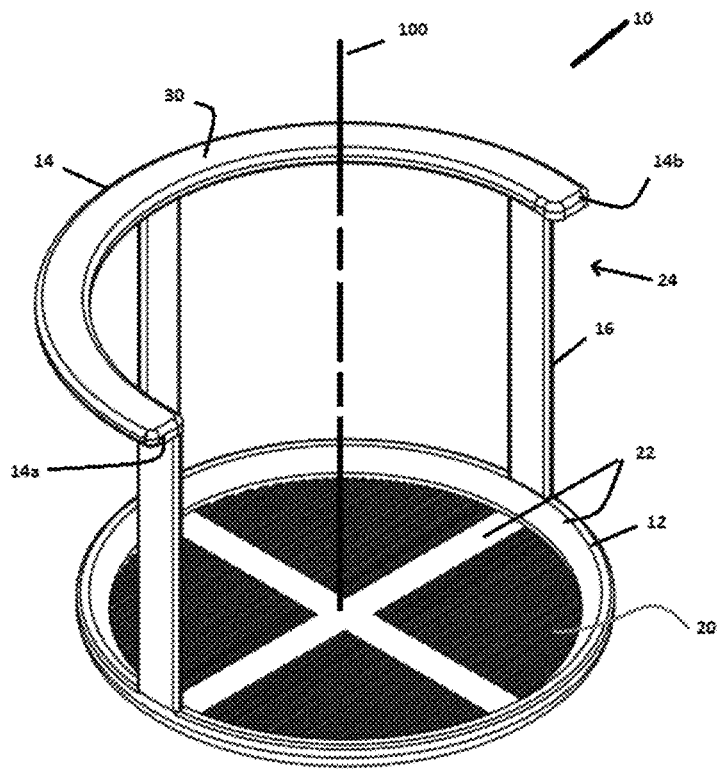
FIG. 1 is perspective top view of an exemplary beverage infusion press according to one or more aspects of the disclosure.
Figure 2:
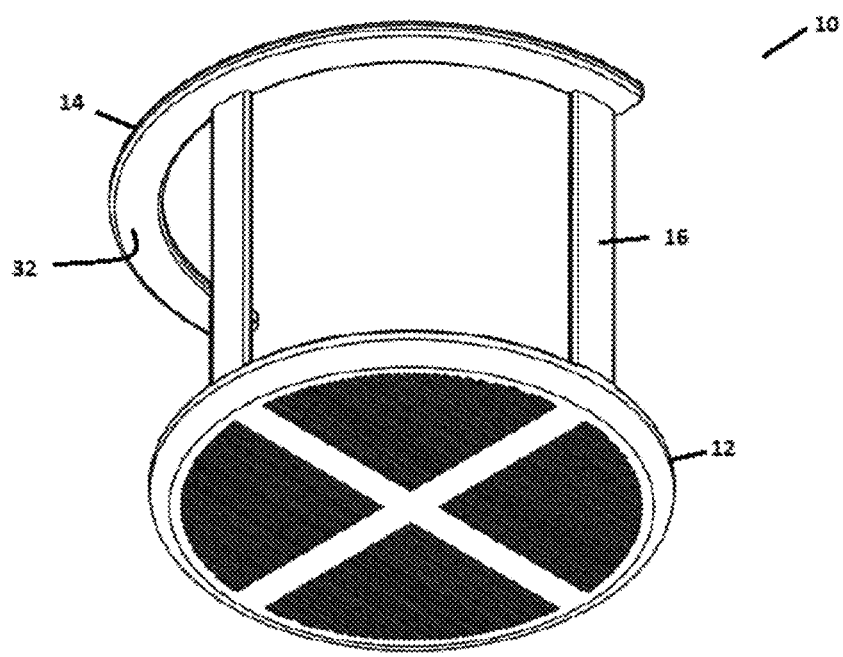
FIG. 2 is perspective bottom view of an exemplary beverage infusion press according to one or more aspects of the disclosure.
Figure 3:
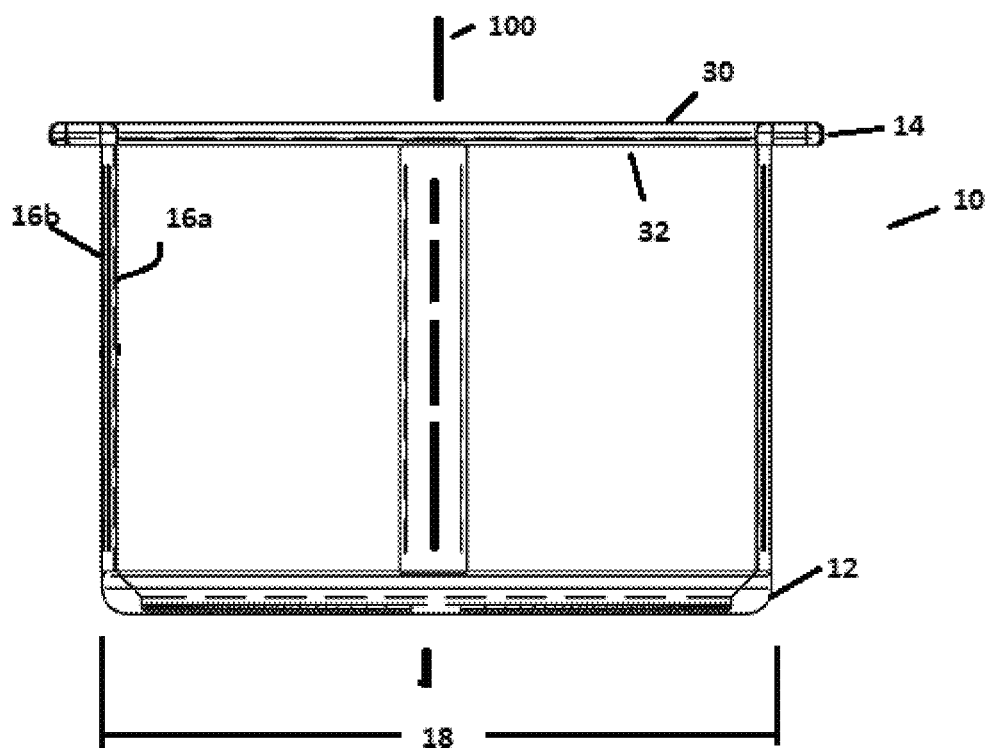
FIG. 3 is an elevation view of an exemplary beverage infusion press.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

The various figures illustrate exemplary aspects of a beverage infusion press 10 operable for use with a drinking cup. Press 10 includes a bottom structure 12, top structure 14, and a vertical structure 16 spacing bottom structure 12 from top structure 14. In an exemplary embodiment, press 10 is a unitary structure formed for example by injection molding or additive manufacturing. Bottom structure 12 and top structure 14 generally extend horizontally and generally parallel to one another.

Bottom structure 12 is a circular member having a central axis 100 and an outside diameter 18 with an outer radius 18R relative to central axis 100. Bottom structure 12 forms a generally planar structure with a filter portion 20 that permits water to pass through bottom structure 12 from one side to the other side and block the flow of particulate, such as coffee grounds or tea leaves, to pass. In an exemplary embodiment, bottom structure 12 includes filter portion 20 and a solid portion 22. Filter portion 20 and solid portion 22 may be constructed of the same material of construction or of different materials of construction. For example, filter portion 20 and solid portion 22 may be a unitary construction formed of the same material, such as a plastic. Filter portion 20 and solid portion 22 may be constructed of different materials of construction, for example, solid portion 22 formed of a plastic and filter portion 20 constructed of metal mesh. Unitary construction or unitary structure is used herein to mean a structure that is formed as a single, continuous unit without connecting individual sections together. For example, a unitary construction or unitary structure may be manufactured by molding, stamping, or additive manufacturing.

Figure 5:
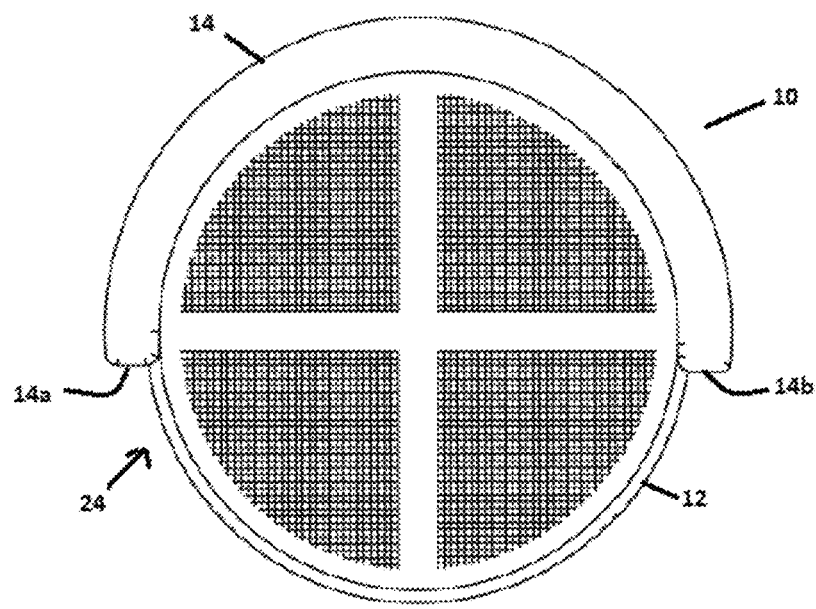
FIG. 5 is top view of an exemplary beverage infusion press.

In the illustrated embodiments, top structure 14 is generally planar, semi-circular member extending circumferentially between a first end 14a and a second end 14b, defining an opening 24 between first and second ends 14a, 14b. Opening 24 provides a location from which a person can drink the infused beverage. With reference to FIG. 5, top structure 14 extends greater than 180 degrees between first end 14a and second end 14b. Top structure 14 may extend less than or greater than 180 degrees.

Figure 4:
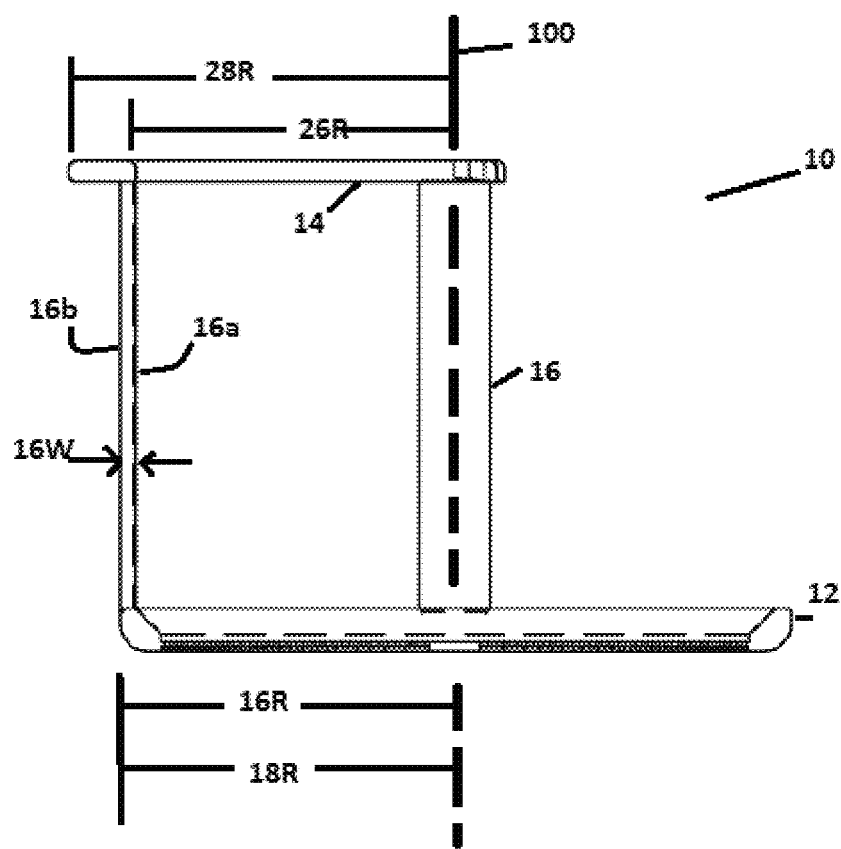
FIG. 4 is elevation view of an exemplary beverage infusion press.

With reference to FIG. 4, top structure 14 has an inner radius 26R and an outer radius 28R measured from central axis 100. Outer radius 28 is greater than outside radius 18R of bottom structure 12. Top structure 14 has a top surface 30 opposite a bottom surface 32 relative to bottom structure 12.

Vertical structure 16 comprises one or more members extending between bottom structure 12 and top structure 14. Vertical structure 16 has a width 16W between an inner surface 16a and an outer surface 16b. Outer surface 16b has an outer radius 16R from central axis 100 that is generally equal to outside radius 18R of bottom structure 12 and greater than inner radius 26R and less than outer radius 28R. In an exemplary embodiment, outer surface 16b is a vertical surface, relative to gravity, and generally coaxial with outer radius 18R of bottom structure 12.

In the illustrated exemplary embodiments, vertical structure 16 comprises three members or legs that are circumferentially separated from one another. Vertical structure 16 may be a single structure or two or more vertical members.

Figure 6:
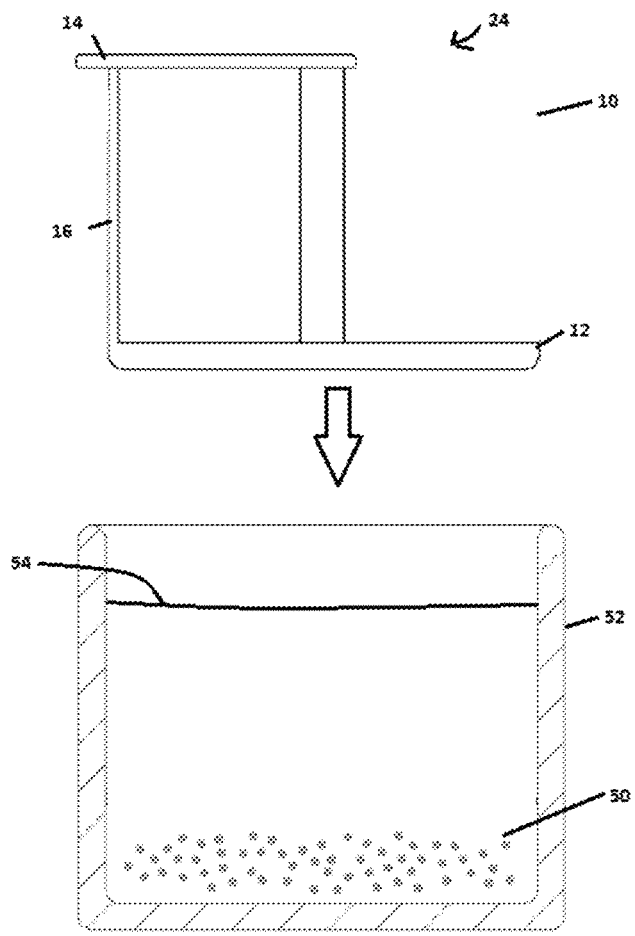
FIG. 6 is schematic illustration of an exemplary method of using an exemplary beverage infusion press.
Figure 7:
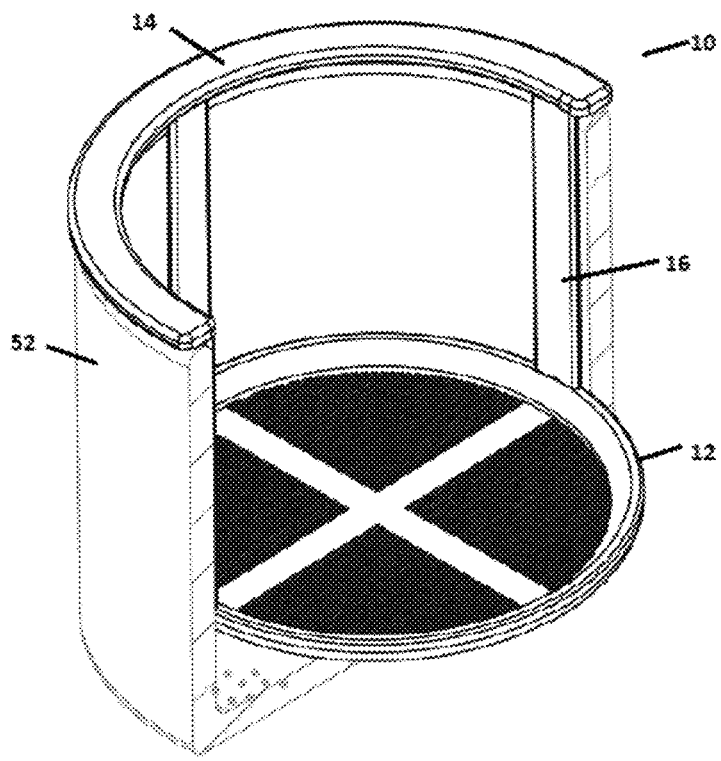
FIG. 7 is a partial section view illustrating an exemplary beverage infusion press in use.
Figure 8:
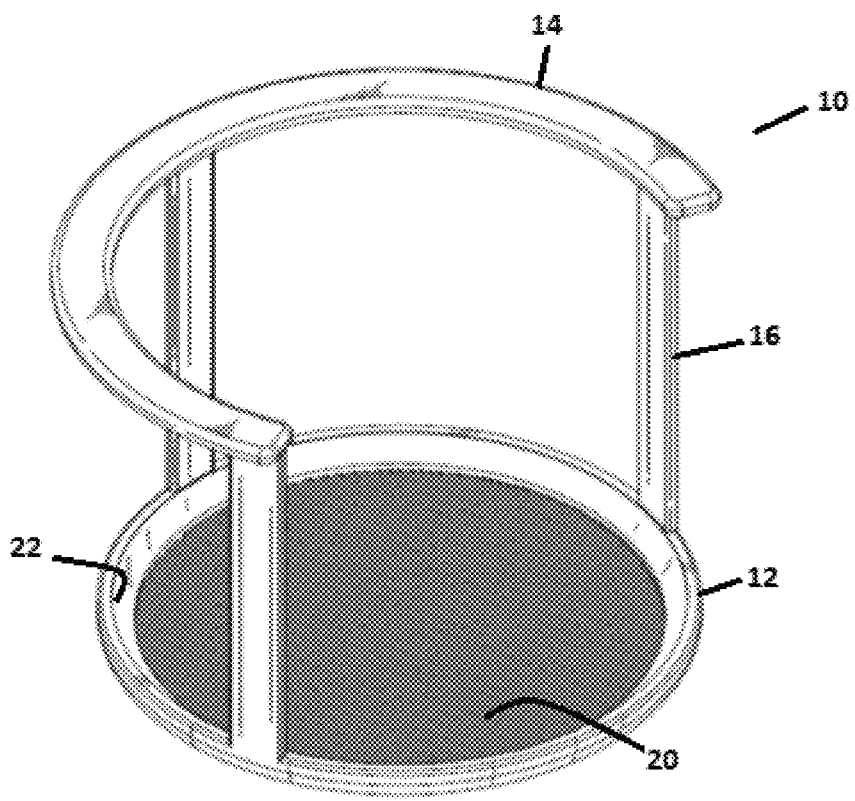
FIG. 8 is perspective top view of another exemplary beverage infusion press.

FIGS. 6-7 illustrate an exemplary method of use, which is described with reference to the various figures. Beverage solids 50, e.g., coffee grounds, tea leaves, herbs, are placed inside of drinking vessel 52. Liquid 54 is added to the drinking vessel 52. Press 10 is placed inside of the drinking vessel 52 and pushed trapping the solids 50 between bottom structure 12 and vessel 52 as the liquid passes through filter portion 20. Top structure 14 remains outside of drinking vessel 52. A user may then drink the infused beverage directly from vessel 52 through opening 24.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "top," "bottom," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A beverage infusion press, comprising:
    a circular bottom structure having an outer bottom radius relative to a central axis and a filter portion operable to permit liquid to pass through the filter portion,
    a semi-circular top structure extending from a first end to a second end and having an inner top radius and an outer top radius relative to the central axis,
    wherein the semicircular top structure is in the form of at least a half circle relative to the circular bottom structure, and wherein the inner top radius of the semicircular top structure has the same radius as the circular bottom structure,
    a vertical structure spacing the circular bottom structure from the semi-circular top structure, the vertical structure comprising an interior surface, and an exterior surface,
    wherein the vertical structure comprises a plurality of vertically oriented and separated members that are circumferentially separated from and not connected to each other by an open space, wherein each of the plurality of vertically oriented and separated members extends between the circular bottom structure and the semi-circular top structure, wherein the exterior surface of each of the plurality of vertically oriented and separated members does not extend beyond the outer bottom radius of the circular bottom structure, and
    wherein the outer bottom radius of the circular bottom structure and the exterior radius of the vertical structure are equal.

2. The beverage infusion press of claim 1, wherein the circular bottom structure, the semi-circular top structure, and the vertical structure are a unitary structure.

3. The beverage infusion press of claim 1, wherein the circular bottom structure, the filter portion, the semi-circular top structure, and the vertical structure are a unitary structure.

4. The beverage infusion press of claim 1, wherein the outer top radius of the semi-circular top structure is greater than the outer bottom radius of the circular bottom structure.

5. The beverage infusion press of claim 1, wherein the circular bottom structure, the semi-circular top structure, and the vertical structure are a unitary structure;
the outer top radius of the semi-circular top structure is greater than the outer bottom radius of the circular bottom structure, and the exterior radius of the vertical structure are equal.

6. The beverage infusion press of claim 5, wherein the vertical structure comprises two or more vertically oriented and separated members circumferentially separated from one another.

7. The beverage infusion press of claim 1, wherein the circular bottom structure, the filter portion, the semi-circular top structure, and the vertical structure are a unitary structure;
the outer top radius of the semi-circular top structure is greater than the outer bottom radius of the circular bottom structure, and the exterior radius of the vertical structure are equal.

8. The beverage infusion press of claim 7, wherein the vertical structure comprises two or more vertically oriented and separated members circumferentially separated from one another.

9. A method comprising:
placing a liquid and particulate for creating an infused beverage in a drinking vessel;
positioning a circular bottom structure of a beverage infusion press in the drinking vessel, the beverage infusion press comprising:
the circular bottom structure having an outer bottom radius relative to a central axis and a filter portion,
a semi-circular top structure extending from a first end to a second end and having an inner top radius and an outer top radius relative to the central axis,
wherein the semicircular top structure is in the form of at least a half circle relative to the circular bottom structure, and wherein the inner top radius of the semi-circular top structure has the same radius as the circular bottom structure,
a vertical structure spacing the circular bottom structure from the semi-circular top structure, the vertical structure comprising an interior surface, and an exterior surface,
wherein the vertical structure comprises a plurality of vertically oriented and separated members that are circumferentially separated from and not connected to one other by an open space, wherein each of the plurality of vertically oriented and separated members extends between the circular bottom structure and the semi-circular top structure, and wherein the exterior surface of each of the plurality of vertically oriented and separated members does not extend beyond the outer bottom radius of the circular bottom structure,
wherein the outer bottom radius of the circular bottom structure and the exterior radius of the vertical structure are equal; and
pushing the beverage infusion press into the drinking vessel trapping the particulate between the circular bottom structure and the drinking vessel as the liquid passes through the filter portion.

10. The method of claim 9, further comprising drinking the liquid from the drinking vessel from a position between the first end and the second end of the semi-circular top structure.

11. The method of claim 9, wherein the semi-circular top structure remains outside of the drinking vessel.

12. The method of claim 9, wherein the circular bottom structure, the semi-circular top structure, and the vertical structure are a unitary structure.

13. The method of claim 9, wherein the circular bottom structure, the filter portion, the semi-circular top structure, and the vertical structure are a unitary structure.

14. The method of claim 9, wherein the outer top radius of the semi-circular top structure is greater than the outer bottom radius and the exterior radius of the vertical structure.

15. The method of claim 9, wherein the outer top radius of the semi-circular top structure is greater than the outer bottom radius and the exterior radius of the vertical structure.

16. The method of claim 9, wherein the plurality of vertically oriented and separated members comprise at least two vertically oriented and separated members.

17. The method of claim 9, wherein the plurality of vertically oriented and separated members comprise at least three vertically oriented and separated members.

18. The method of claim 9, wherein the beverage infusion press is freely rotatable in the drinking vessel.

\* \* \* \* \*